Jan. 7, 1958 J. LA VIA 2,819,332

COLOR TELEVISION DISPLAY SYSTEM

Filed May 21, 1951

INVENTOR.
JOSEPH LA VIA

BY Percy Freeman

ATTORNEY.

United States Patent Office 2,819,332
Patented Jan. 7, 1958

2,819,332

COLOR TELEVISION DISPLAY SYSTEM

Joseph La Via, Ridgewood, N. Y.

Application May 21, 1951, Serial No. 227,466

12 Claims. (Cl. 178—5.4)

The present invention relates to methods and means to reproduce in natural colors a televised scene containing objects of various colors. More particularly it pertains to a novel system wherein the synthesized image is projected onto a large viewing screen such as used in theatres, auditoriums, etc. Another feature of the invention is the utilization of a direct viewing image tube wherein images in natural colors are reproduced.

In general, it is proposed to use in a projection system a single cathode ray tube which contains a crystal screen capable of effecting color variation under control of a scanning cathode ray beam impinging upon the target surface thereof, the image formed on the opposite side of the crystal being then projected onto a viewing screen. The crystal screen within the direct viewing image tube is coated with a suitable phosphor to produce white light in the production of conventional monochrome images, and the scanning beam, suitably conditioned, will cause the reproduction of images in natural colors. In both systems the scanning beam has been modulated with a tri-chromatic video signal representative of a televised scene.

It is an object of the present invention to provide a cathode ray tube having therein a single image reproducing crystal capable of effecting color variation under control of a single scanning electron beam.

Another object is the inclusion of such a tube in the optical axis of a projection system.

Another object is the production of colored images on one surface of said crystal and means to project the images onto a viewing screen.

Another object is the production of monochrome variable density elemental areas in an ionic crystal screen and obtaining therefrom color-controlled elemental areas of same.

Another object is to cyclically apply to a scanning electron beam, different frequency periodicities to obtain in individual elemental areas of said crystal, light wave interferences of various orders to obtain therefrom a plurality of chromatic light effects representative of the three primary colors required in the reproduction of television images.

Another object is the production of colored variable densities in elemental areas along the scan lines of the viewing surface of a crystal capable of effecting color variation.

Another object is to provide an image tube capable of color variation obviating the use of filters, optical means, or a plurality of color reproducing screens.

A further object is to provide in a direct viewing image tube an image screen comprised of an ionic crystal screen coated on the target side with a white light producing phosphor, said crystal and phosphor coating capable of effecting color variation under control of a suitable scanning electron beam to synthesize an image in natural colors on the opposite (anode) surface of the screen.

A further object is to provide in a cathode ray tube, means to reproduce colored or monochrome images.

Figure 1:
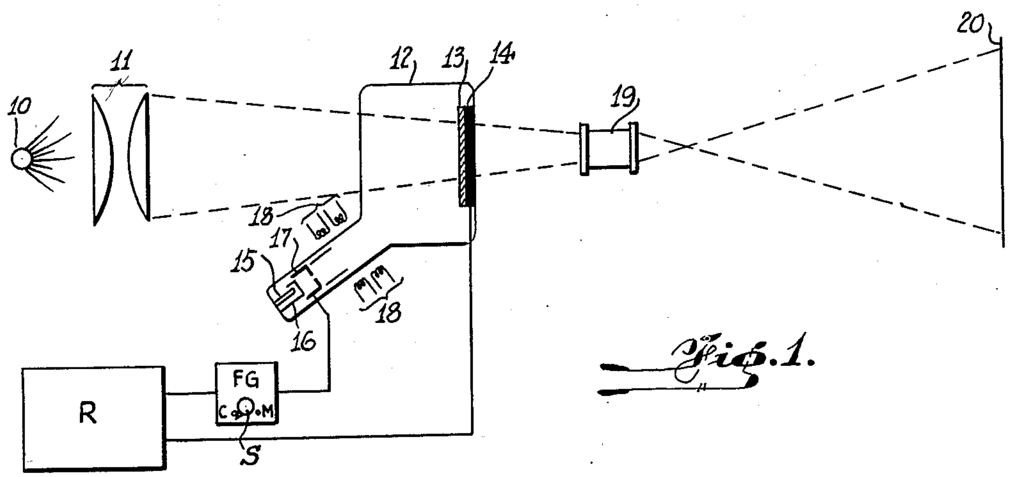
Fig. 1 represents diagrammatically one embodiment of television receiver according to the present invention.

Certain crystals when subjected to an excitation medium such as a conditioned scanning cathode ray beam impinging upon the target surface, will cause to effect on the anode surface of the crystal, variable density elemental areas analogous to the sensitometry of photographic materials when acted upon by light or other radiant energy. These areas are presumed to be produced by positive ions (cations), or electrons released from the crystal lattice of the halide anion and tend to absorb energy from light incident to the crystal.

On the distal side of the crystal there has been spattered or evaporated a transparent metal coating to which there is applied a suitable positive potential to control the speed of the electrons through the lattice toward the coating or anode and then disappear, thus creating a storage effect in the overall image.

For example, the screen may be comprised of a crystalline structure of any alkali metal halide, in this instant, such as potassium chloride; other alkali halides may be constructed from the bromides, chlorides, fluorides and iodides of lithium, sodium, potassium, rubidium, caesium and virginium, these elements being commonly referred to as "the most electro-positive group," their atoms showing the greatest tendency to lose electrons. Other suitable combinations may be used, which in general are termed ionic crystals.

A beam of white light is directed normal to a projection type of image tube and incident to the crystal contained therein. Coloration is obtained by an electron beam directed along elemental areas (point to point) of the scan lines of the surface of the potassium halide crystal and chromatic values representative of the three primary colors will be subtracted from the light beam as hereinafter described.

The electron beam is cyclically impressed with a different frequency periodicity in N successive levels, i. e. the beam is pulsed or interrupted at N different periodicities, one order of periodicity for each level, to cyclically release N1—N2—N3 orders of spaced electrons respectively within the crystal. In each case, the free electrons are drawn to the anode and disappear.

For example, at frequency periodicity P1, the scanning beam will cause the crystal to emit on the anode side, light of a suitable wave-length, in this instant, red. At P2, the resultant light will be green, and at P3, the light is of the blue value.

The electron beam under control of P1, and the red portion of a trichromatic video signal impinging upon the first elemental area of the first scan line causes to be released within the crystal N1 electrons in spaced relation in accordance to the periodicity impingements, thus causing light wave interference. As the beam traverses the successive scan lines, from point to point, various successive elemental areas become similarly activated in accordance to the instantaneous intensity and value of the color-controlled video signal, in this instance resulting in the emergent spectral range of red.

Upon the completion of the scansion for the red, the passive beam returns to its starting point and under control of P2 and the green portion of the video signal, it repeats the scanning cycle; series of groups of differently spaced electrons N2 (along the scan lines) are releasesd within the crystal, thus creating in successive elemental areas light interference of a different order, to obtain in this instance, emergent various shades of green.

Again, the beam returns to its starting point and under control of P3, and the blue portion of the video signal, it traverses the various elemental areas; groups of spaced electrons N3, are released in the various elemental areas within the crystal, thus creating light interference of another order, to produce at this time, emergent variously shaded density areas in blue.

This cycle of scanning is thereafter repeated in an orderly manner to selectively permit, by means of the three orders of light wave interferences, the passage through the crystal of portions of the light beam resulting in the brightness and shades of the three primary colors. In this process, three partial images, in red, green and blue are reproduced to blend into one composite image representative of a televised scene, and the inverted image formed on the distal (anode) side of the crystal is projected onto a viewing screen by means of an objective lens positioned in front of the tube.

Figure 2:
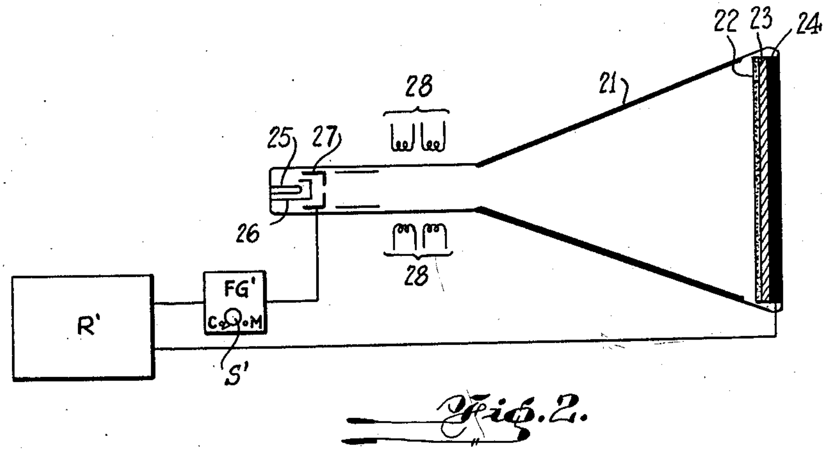
Fig. 2 represents diagrammatically another embodiment of television receiver according to the present invention.

A further illustration of light interference obtained within a cathode ray tube is the utilization of a direct viewing image tube, as shown in Fig. 2. This type is provided with a novel form of viewing screen comprised of a potassium halide crystal having a positive potential anode as previously described, and the target side has thereupon a layer or coating of white light producing phosphor.

The scanning frequency periodicity order is the same as disclosed in the projection system (Fig. 1). As the pulsed color-controlled modulated scanning beam impinges upon point to point or elemental areas of the scan line, white light is obtained therealong, the electrons of the beam penetrate through the phosphor layer and activate the crystal to obtain therein light wave interferences in accordance with the cyclic periodicity impingements.

The repeated cyclic scanning of the pulsed beam results in variable density colored areas along each line of the anode, thus synthesizing an image in natural colors in synchrony with a televised scene. Again, it is understood that three partial images in the shades and brightness of red, green and blue are reproduced and blend into a composite natural colored image representative of said televised scene.

Referring to the drawings, Fig. 1 shows a source of common or white light 10, the condensers 11 forming a beam of light normal to a single cathode ray projection type tube 12, having therein a screen capable of effecting color variation; this screen is comprised of a single potassium halide crystal 13, having a transparent anode 14. Within the tube are positioned a heater filament 15, cathodic emissive electrode 16, a control grid 17; and the scanning of a single electron beam upon the surface of the screen is accomplished by the coils 18. As the image is formed on the surface of the anode 14, of the crystal, the light rays passing therefrom are collected by an objective lens 19, and thence projected onto a spatially positioned viewing screen 20.

In conjunction with the tube 12, is a television receiver R, a frequency generator FG, which cyclically generates frequencies of periodicities in three successive levels, and which is connected to the grid 17, a switch S, which is operable from C (color) to M (monochrome), and a suitable positive potential is applied to the transparent anode 14.

Another embodiment of the present invention is shown in Fig. 2; a single cathode ray image tube 21, contains a combined screen comprised in part of a suitable phosphor 22, which when impinged upon by a single electron scanning beam produces white light. This phosphor is supported upon the proximal surface of a potassium halide crystal 23, having upon its distal surface a transparent anode 24.

The image tube 21, contains the conventional elements consisting of a heater filament 25, cathodic element 26, control electrode or grid 27, and the scanning coils 28.

This tube is in association with a receiver R', a frequency generator FG', which is connected to the grid 27, and operates similarly to the frequency generator described in Fig. 1, and a switch S', operable from C (color) to M (monochrome).

The mode of operation is as follows:

Again referring to Fig. 1, light from the source 10 is formed into a light beam and directed through the projection tube 12, and incident to the crystal screen; a single electron beam generated therein is impressed with a suitable frequency periodicity and modulated with the signal components of red, of a tri-chromatic color-controlled video signal representative of the elemental areas of colored objects lying along each scan line of a televised scene. As the scanning beam traverses across the first line of the single potassium halide crystal 13, variable density elemental areas of various shades and brightness of red are caused to be effected on a corresponding line of the surface of the anode 14, in accordance with the periodicity of the interruption of the scanning beam and the instantaneous intensity of the color-controlled video signal. The coloration of each elemental area is the product of the constant frequency interruptions imparted to the scanning beam causing the crystal to release electrons which are then dissipated by the attraction of the positive potential applied to the anode 14.

At each burst of negative electrons (constant frequency periodicity) contained in the scanning beam impinging upon the surface of the potassium halide screen, groups of positive ions or electrons are released therefrom, pass through the crystal lattice and speed toward the transparent screen anode. At any given instant (time interval for the scanning of one elemental area), spaced electrons of one order are released therethrough, and these electrons propagating substantially parallel to the optical axis of the projection systems, cause light wave interference such that they occlude colors of the spectrum other than light of a desired wave length.

Upon the completion of the first scansion cycle, the electron beam returns to its starting point, and as it begins to traverse along the scan lines of the screen, the beam is altered to a different frequency periodicity, thus releasing electrons differently spaced in passing through the crystal towards the positive potential anode, thus producing by light wave interference in this instance, the hue of green. The scanning beam modulated with the green signal components of the color-controlled video signal will deliver energy to the various successive elemental areas in accordance with the instantaneous intensity representing the various green shades contained in the televised scene.

Again, upon the completion of this scansion cycle, the beam returns to its starting point, and as it begins to scan the crystal, the frequency periodicity impingement is again altered so as to produce therein electrons again differently spaced, thus producing by light wave interference the hue of blue. The scanning beam modulated with the blue portions of the color-controlled video signal will cause along each scan line on the surface of the anode, chromatic effects representative of the various shades and brightness of this color in synchrony with each scanned line of the televised scene.

Upon the completion of the third scansion, the electron beam begins to scan the crystal in an orderly cyclic manner to effect therein, by different wave interferences, elemental areas upon its anode surface of the requisite colors needed in the reproduction of television images.

By cyclically changing the frequency periodicity impingements of the scanning beam to effect the release of electrons within the crystal in differently spaced groups through elemental areas, it will produce of the beam of white or common light directed therethrough, different chromatic effects. In this manner, specific color values are subtracted from the total sum of the chroma contained in the light beam.

Thus, as an inverted image in natural colors is reproduced on the crystal screen anode surface, the light rays passing therefrom will be collected by the objective lens and projected onto the spatially positioned viewing screen.

In the event of the desired reproduction of monochrome images, a suitable operable switching means S may be set to maintain the periodicity of the scanning beam at a constant level, either for the blue or the green. It is understood that the receiver is so constructed that only one of these colors is obtained for the monochrome images.

In another embodiment of the present invention as shown in Fig. 2, a single cathode ray image tube 21, contains therein an image viewing screen comprised of a phosphor coating 22, supported upon and may be coextensive with the potassium halide crystal 23, and the opposite side of the crystal has a transparent metal anode 24, which has a suitable positive potential applied thereto to permit the passage or attraction of free electrons to pass through the crystal to said anode and then disappear.

The tube 21 also contains the elements common to a monochrome cathode ray tube, and as the single electron scanning beam which is interrupted or maintained at a certain periodicity and modulated with the red portions of a color-controlled video signal, it begins to sweep the elemental areas of each scan line of the phosphor coating, the impingements passing through the phosphor will produce white light in accordance with the instantaneous intensity of the signal, and activate the crystal to effect therein the release of spaced electrons, thus causing light wave interference of the white light produced in the phosphor; these electrons are then draw to the transparent anode. In this manner, various shades of red are successively reproduced along corresponding elemental areas on the surface of the anode surface 24.

Upon the completion of the first scansion, the beam returns to its starting point, and as it starts to traverse the elemental areas of each successive scan line of the phosphor screen surface, the beam is altered to a different frequency periodicity and modulated with the signal components representative of the green contents of the color-controlled video signal. Again, the scanning beam will penetrate through the phosphor to produce white light of varying intensity and the excitation of the beam will cause to release electrons in the crystal, of a differently spaced order, thus creating light wave interference of the white light produced in the phosphor, reproducing on the transparent anode various shades of the green hue.

Upon the beginning of the third scansion, for the blue, the electron beam is again altered to a different frequency periodicity and modulated with the blue signal components of the color-controlled video signal. As it starts to traverse the elemental areas of each successive scan line of the phosphor, the beam will penetrate through the phosphor to again produce white light, and simultaneously create within the crystal differently spaced electrons of another order, thus causing light wave interference resulting in the various shades and brightness of blue on the viewing surface.

Upon the completion of the third scansion, a complete image in natural colors is synthesized on the viewing surface in synchrony with the scanned lines of a televised scene and this cyclic scanning is repeated in an orderly manner.

To obtain televised monochrome images, the switch S' is suitably positioned from C (color) to M (monochrome) so as to maintain the electron beam at a constant periodicity level, either for the blue or green, and it is again understood that the receiver is conditioned to reproduce images in only one of these colors.

While no definite method of scanning has been described, it is understood that any scanning order, such as simultaneous or sequential dot, simultaneous or sequential line scanning and field sequential patterns may well be developed, wherein light wave interferences are produced in point to point or elemental areas of a color image reproducing crystal as described per se, such methods shall be considered as coming within the scope of this invention.

It is further understood that while the drawings and descriptions provide for the combination of a single scanning beam cyclically pulsed at three different constant periodicities and directed over the screens per se, multiple beams cyclically pulsed at different constant frequencies can also be employed to produce monochrome variable density elemental areas and obtaining therefrom color-controlled elemental areas of same, such being several of the objects of the present invention. Any tube employing a plurality of means for producing multiple beams cyclically pulsed at different frequency levels and scanningly directed over these screens shall also be considered as residing within the scope of the present invention.

Various other alterations and modifications of the present invention may become apparent to those skilled in the art, and it is desirable that any and all such modifications and alterations be considered within the purview of the present invention except as limited by the hereinafter appended claims.

I claim:

1. In an image-forming apparatus, a receiver and a cathode ray image tube having therein a single alkali halide screen, a white light producing phosphor coating supported upon the target side of the screen and a transparent anode surface on the opposite side to which is applied a suitable positive potential whereby electrons in said alkali halide are drawn thereto, and an electron gun to produce a single scanning electron beam; a frequency generator to interrupt the beam in N different constant impingement periodicity cyclic levels, means to scan the beam from point to point elemental areas of said phosphor coating in synchrony with the scansion pattern of a televised scene, and means to modulate each periodicity level of the beam in successive order with a different respective portion of a received tri-chromatic video signal, said scanning causing to produce at each point of impingement modulated light, and to create therein one $N^{th}$ of N different orders of uniformly spaced electrons, said order of spaced electrons causing one $N^{th}$ of N different orders of light wave interferences of the light in passing therethrough in accordance with the instantaneous intensity and periodicity of the modulated beam, each different order of light wave interference effecting the spectral range of each of the primary colors in cyclic successive order to obtain resultant multi-colored variable density elemental areas on corresponding areas of the anode surface, said elemental areas synthesizing a plurality of successive differently colored partial images representative of the hues and brightness of the scansions of said scene.

2. The invention set forth in claim 1, further characterized by having means to maintain said beam at a constant periodicity level to reproduce monochrome images.

3. In an image-forming apparatus, the combination, a cathode ray tube having an image screen capable of separating the spectral components of white light, said screen comprising an alkali halide crystalline structure, a transparent metal anode on the viewing side to which is applied a suitable positive potential and a white light producing phosphor coating on the target side, an electron gun to generate a cathode ray beam in said tube, a frequency generator to impart to the beam N constant impingement periodicity cyclic levels, scanning means to direct said beam from point to point elemental areas over the phosphor coating in each of the periodicity levels to produce white light at each impingement area, said cyclic impingements creating in the screen N successive different orders of uniformly spaced electrons, each different order of spaced electrons permitting the passage therethrough to effect on the anode each of the spectral components of the three primary colors in successive cyclic sequence of the white light passing therethrough and means to modulate each periodicity level with a respective portion of a tri-chromatic video signal to reproduce on said anode an image in natural colors.

4. A system for reproducing a colored image, comprising in combination, a receiver and a cathode ray tube having therein an alkali halide crystal screen, one side serving as the target surface and having on the opposite side a transparent anode surface to which is applied suitable positive potential whereby electrons in said alkali halide are drawn thereto, a source of white light and a spatially positioned viewing screen, an electron gun for generating an electron beam, a frequency generator to cyclically impart to the electron beam N different constant impingement periodicity levels, means to direct white light from said source through the screen, means to modulate each periodicity level with a different respective portion of a received tri-chromatic video signal and scanning means to direct said electron beam from point to point elemental areas of the crystal target screen in said N successive constant periodicity cyclic levels to obtain in each successive elemental area one of N different orders of uniformly spaced electrons, each different order of spaced electrons creating therein a different order of light wave interference in accordance with the instantaneous intensity and periodicity of the scanning beam of the light in passing therethrough, each of the different orders of light wave interferences effecting on corresponding areas of the anode surface the spectral range of each one of the primary colors in successive cyclic sequence to synthesize a composite colored image, and means to project said image onto the viewing screen.

5. The invention set forth in claim 4, further characterized by having selective means to maintain the electron beam at a constant periodicity level to reproduce a monochrome image.

6. An image-forming system comprising in combination a source of white light, a receiver and a cathode ray tube having therein an alkali halide screen, one side serving as the target surface and having on the opposite side a transparent anode surface to which is applied a suitable positive potential, whereby electrons in said alkali halide are drawn thereto, an electron gun for generating an electron beam, a frequency generator to cyclically impart to the electron beam N different constant impingement periodicity levels, means to direct white light from said source through the alkali halide screen, means to modulate each periodicity level with a different respective portion of a received trichromatic video signal and means to scan said electron beam from point to point elemental areas of the screen, said impingement causing therein N different successive orders of uniformly spaced electrons, said orders of spaced electrons creating N different successive orders of light wave interferences of the light in passing therethrough in accordance with the instantaneous intensity and periodicity of the electron beam, each order of interference effecting on the anode surface the spectral range of each one of the primary colors in cyclic successive sequence to synthesize a composite colored image.

7. The invention set forth in claim 6, further characterized by having selective means to maintain the electron beam at a constant periodicity level to reproduce a monochrome image.

8. An image-forming system comprising in combination a source of white light and a spatially positioned viewing screen, a receiver and a cathode ray tube having therein an alkali halide screen, one side serving as the target surface and having on the opposite side a transparent anode surface to which is applied a suitable positive potential whereby electrons in said alkali halide are drawn thereto, an electron gun for generating an electron beam, a frequency generator to cyclically impart to the electron beam N different constant impingement periodicity levels, means to direct white light from said source through the alkali halide screen, means to modulate each periodicity level with a different respective portion of a received tri-chromatic video signal and means to scan said electron beam from point to point elemental areas of the screen to cause therein N different successive orders of uniformly spaced electrons, each order of spaced electrons permitting to pass the spectral range of each primary color in cyclic successive sequence to synthesize a composite colored image, and means to direct the colored image onto said screen.

9. An image-forming apparatus comprising in combination, a source of white light, a receiver and a cathode ray tube having therein an alkali halide screen, one side serving as the target surface and having on the opposite side a transparent anode surface to which is applied a suitable positive potential whereby electrons in said alkali halide are drawn to said anode, an electron gun for generating an electron beam, a frequency generator to cyclically impart to the electron beam N different constant impingement periodicity levels, means to direct white light from said source through the alkali halide screen, means to modulate each periodicity level with a different respective portion of a received trichromatic video signal and scanning means to direct said electron beam from point to point elemental areas of the screen, said electron beam causing therein N different successive cyclic orders of uniformly spaced electrons, the spaced electrons producing monochromatic variable density elemental areas in the screen, said variable density elemental areas differently altering the light transmission characteristics of said screen, each altering of the light transmission characteristics effecting on the anode surface the spectral range of each primary color in cyclic successive sequence, and each area having a color different from its adjacent area to synthesize a composite colored image.

10. In an image-forming system the combination, a cathode ray tube having an image screen capable of separating the spectral components of white light, said screen compriisng an alkali halide crystalline structure, a transparent metal anode on the viewing side to which is applied a suitable positive potential and a white light producing phosphor coating on the target side, an electron gun to generate a cathode ray beam in said tube, a frequency generator to impart to the beam N constant impingement periodicity cyclic levels, and means to modulate each periodicity level of the beam in successive order with a different respective portion of a received trichromatic video signal representative of a televised scene, and scanning means to direct said beam from point to point elemental areas over the phosphor coating in each of the periodicity levels to produce modulated light at each impingement area, said cyclic impingements creating in the halide N successive different orders of uniformly spaced electrons, said spaced electrons producing monochromatic variable density elemental areas in the halide, and the monochromatic variable density elemental areas effecting resultant multi-colored variable density elemental areas on corresponding areas of the anode surface to reproduce a composite image representative of the hues and brightness of colored objects contained in said televised scene.

11. In a color television receiving system the combination, a cathode ray tube having an image screen capable of separating the spectral components of white light, said screen comprising an alkali halide crystalline structure, a transparent metal anode on the viewing side to which is applied a suitable positive potential and a white light producing phosphor coating on the target side, an electron gun to generate a cathode ray beam in said tube, a frequency generator to impart to the beam N constant impingement periodicity cyclic levels, and means to modulate each periodicity level of the beam in successive order with a different respective portion of a received trichromatic video signal representative of a televised scene, and scanning means to direct said beam from point to point elemental areas over the phosphor coating in each of the periodicity levels to produce modulated light at each impingement area, said cyclic impingements creating in the halide N successive different orders of uniformly spaced electrons, the spaced electrons producing monochromatic variable density elemental areas in the halide, said variable density elemental areas differently altering the light transmission characteristics of said halide, each altering of the light transmission characteristics effecting on the anode surface the spectral range of each primary color in cyclic successive sequence, and each area having a color different from its adjacent area to synthesize a composite colored image.

12. An electron device comprising in combination, a tube employing a screen comprised of a white light producing phosphor overlying an alkali halide, and means to maintain said screen in an electric field, an electron gun to produce a cathode ray beam therein, means to cyclically impart to the beam N constant impingement periodicity levels and scanning means to direct said beam over the screen during tube operations said impingements creating white light in the phosphor and creating in the screen N different orders of uniformly spaced electrons, and each different order of spaced electrons permitting the passage through the screen of each of the primary colors in cyclic successive sequence in accordance with the periodicities of the beam.

References Cited in the file of this patent

UNITED STATES PATENTS

| | | |
|---|---|---|
| 2,330,172 | Rosenthal | Sept. 21, 1943 |
| 2,545,974 | Schroeder | Mar. 20, 1951 |

OTHER REFERENCES

Rosenthal: Proc. I. R. E., vol. 28, #5, May 1940, pages 203–212.

The Skiatron or Dark Trace Tube, in Electronic Engineering, London, January 1948, pages 20–22.